Patented July 11, 1950

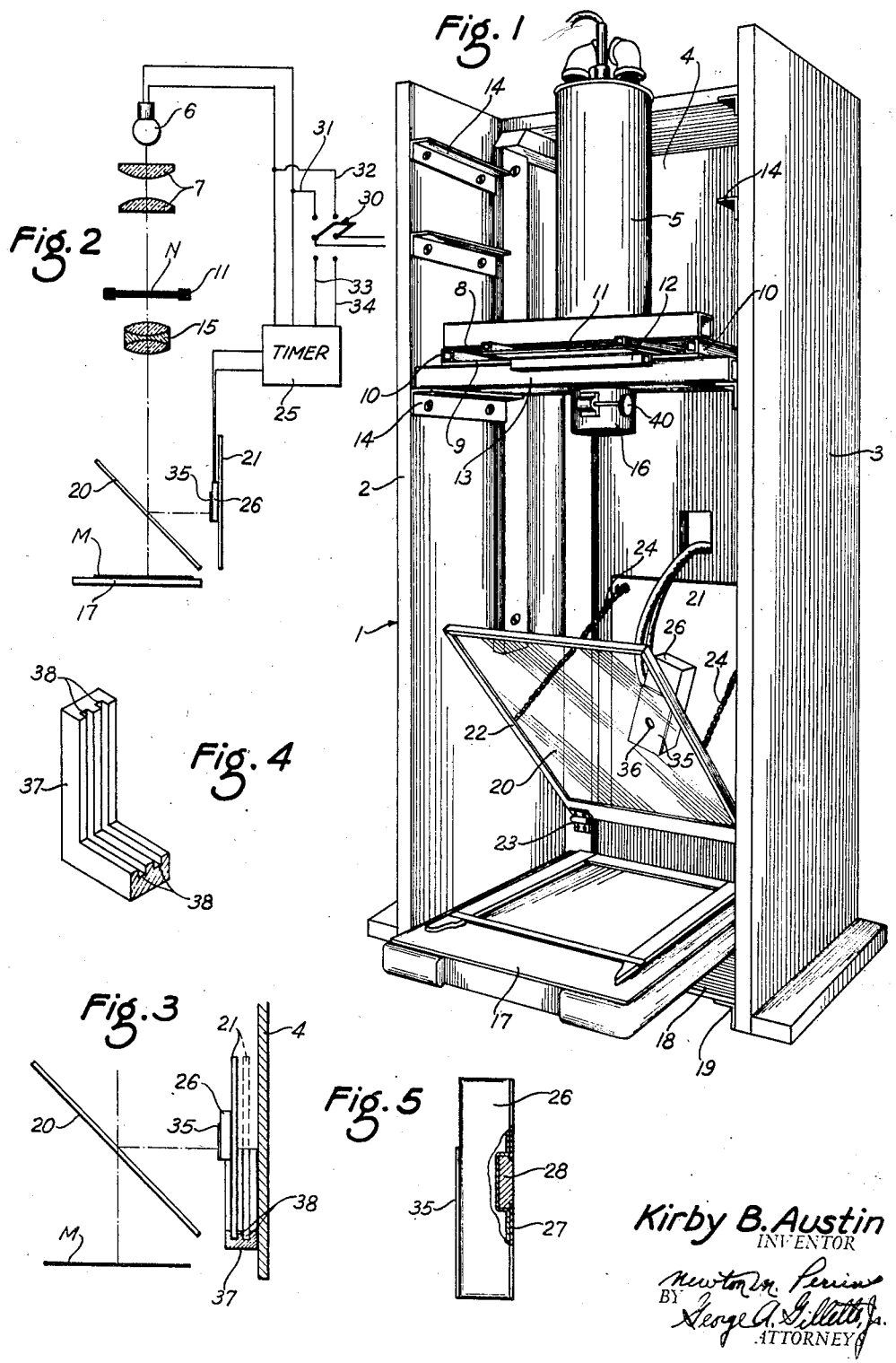

2,514,595

UNITED STATES PATENT OFFICE 2,514,595

ILLUMINATION CONTROL MOUNTING MEANS FOR PHOTOGRAPHIC PRINTING APPARATUS

Kirby B. Austin, Tuckahoe, N. Y., assignor to Eastman Kodak Company, Rochester, N. Y., a corporation of New Jersey Application April 26, 1947, Serial No. 744,166

4 Claims. (Cl. 88—24)

This invention relates to photographic printing apparatus and more particularly to a printer of the projection type in which a photo cell is used to determine the exposure time.

As is well-known in the art of projection printing, a photo cell may be placed over the image of the negative in the printing position to measure the light intensity for determining the proper exposure time. When a considerable number of prints are to be made, particularly on a commercial basis, considerable time is consumed by the operator in placing the photo cell in the desired position on the negative image and then removing it for exposing the sensitized material. In the present invention, the cell is connected to an automatic timer for controlling the exposure, and the operator merely moves the cell about on the support plate to the position desired for measuring the exposure which is then automatically controlled by the timer unit.

The primary object of the invention is to provide a photographic printing apparatus in which the light sensitive means is supported on a metal plate and movable thereover with respect to the reflected negative image on the plate.

Another object of the invention is to provide a photographic printing apparatus in which the light sensitive means is supported on a metal plate by means of the magnetic attraction between a magnetic material carried by the exposure measuring means and ferrous metal plate.

Yet another object of the invention is to provide a photographic printing apparatus in which the mounting means for the supporting plate permits either the plate or the screen member carried by the exposure measuring means to be positioned in the focal plane of the objective.

These and other objects of the invention will be apparent from the following description.

The above objects of the invention are embodied in a photographic printing apparatus having a light source for illuminating the negative and an objective for projecting the illuminated image of the negative onto a light sensitive material in the printing position. A beam splitting means is interposed between the objective and light sensitive material for obtaining a plurality of negative images and for transmitting one of the images of the negative onto the sensitized material and for reflecting the other negative image onto a metal plate. A photo cell controls the light source through a conventional timer and is supported on a metal plate which is in a plane perpendicular to the plane of the negative and in the focal plane of the objective. The photo cell has mounted in its rear wall a magnetic material for holding the cell on the ferrous metallic plate and which permits moving the cell into any position on the plate with respect to the negative image. The cell may also have mounted thereon a screen member, and means may be provided for mounting either the metal plate or the screen member in the focal plane of the objective for receiving the reflected negative image.

Reference is now made to the accompanying drawing wherein like reference numerals designate similar parts and wherein:

Fig. 1 is a perspective view of a photographic printer in which the invention has been embodied;

Fig. 2 is a diagrammatic arrangement of the principal elements of the invention;

Fig. 3 is a side elevation, partially in section, showing the arrangement for mounting the support means for the photo cell;

Fig. 4 is a detail perspective view of the mounting means; and

Fig. 5 is a side elevation, partially in section, showing the arrangement for mounting the magnetic material in the photo cell.

In the illustrated embodiment of the invention, the photographic printing apparatus comprises the frame 1 consisting of the side walls 2 and 3 and a rear wall 4 and the lamp housing 5 in which the light source 6 and condenser lenses 7 are mounted in any well-known manner. The lamp housing 5 is mounted on the plate 8 which is spaced from the plate 9 by the tubular members 10. The plates 8 and 9 are provided with apertures, not shown, between which the negative holder 11 is positioned. The negative holder 11 is positioned between the plates 8 and 9 and is provided with a stop member 12 secured to the underside thereof and which abuts the plate 9. The plate 9 is secured to a support member 13 which rests on the angle members 14 secured to the walls 2 and 3 for providing a plurality of positions for the member 13 to obtain different magnifications of the negative. The objective 15 is mounted in the tubular sleeve 16 on the underside of the member 13 and is focused by means of the knob 40. The objective 15 projects the illuminated image of the negative N onto the sensitized material M on copy board 17 which rests on the plate 18 and which is positioned on the angle members 19 in the printing position.

The beam splitting means comprises a transmitting reflecting mirror 20 which is positioned between the objective 15 and the copy board 17 for transmitting the projected negative image onto the sensitized material M and, at the same time, reflecting the projected negative image onto the plate 21. The mirror 20 is mounted in a frame 22 which is hinged to the rear wall at 23 and held in proper angular position by the chains 24 secured to the frame 22 and the plate 21.

The light sensitive means for controlling the timer 25 comprises a photo cell 26 which has mounted in the rear wall 27 thereof a magnetic material 28, see Fig. 5, of a size which is sufficiently large to ensure holding the cell 26 to the plate 21 by means of magnetic attraction, see Fig. 1. With this arrangement for securing the cell 26 to the plate 21, the cell can be moved to any position over the image on the plate for choosing the proper point at which to measure the exposure necessary for the negative being printed.

The supporting means for the light sensitive means 26 comprises a plate 21 which is of a ferrous metal and secured to the rear wall 4. It will be noted from Figs. 1 and 2, that the plate 21 is displaced from the common axis of the light source 6, the condenser lenses 7, and the objective 15 and is in a plane perpendicular to the plane of the negative N. The sensitized material M and the plate 21 are both in the focal plane of the objective 15 so that focusing of the objective 15 produces a sharp image on both the sensitized material and the plate.

In the operation of the above described device, the negative N is placed in the holder 11 and positioned between the plates 8 and 9. The light source 6 is then energized by moving the double-throw switch 30 to close the circuit to the lamps through the lines 31 and 32. After focusing the image on the board 17, the cell 26 is moved over the image on the plate 21 to the desired spot for obtaining the correct exposure at that spot. The switch 30 is then opened and the sensitized material M is placed in position on the copy board. The switch 30 is then moved in the opposite direction to close the circuit to the timer 25 by the lines 33 and 34. The negative image which is now reflected by the mirror 20 onto the cell 26 will control the time of lamp energization. Inasmuch as the timer 25 does not constitute part of the invention, and any one of several commercial types of timers may be used, it has been shown only in diagrammatic form in Fig. 2.

The cell 26 may be provided with a screen member 35 for receiving the reflected negative image and has an aperture 36 for permitting the illumination to reach the light sensitive element. When the screen member is used the image thereon will be out of focus because of its displacement from the plate 21. To overcome this difficulty, particularly when it is desired to place the cell 26 on a particular small area of the negative image, a mounting frame 37 is provided for the plate 21. The mounting frame 37 is a U-shaped member which is secured to the rear wall 4 and has a plurality of spaced slots 38 for the plate 21. The slots 38 are located in the frame 37 so that when the plate 21 is in the forward slot, as shown in Fig. 3, it is positioned in the focal plane of the objective 15, and when in the rear slot, as indicated by the dotted lines in Fig. 3, the screen member 35 on the cell 26 is in the focal plane of the objective. This arrangement permits more accurate locating of the cell 26 over the negative image on the plate 21.

Since other modifications of the invention can be readily devised by those skilled in the art, the present disclosure is to be construed in an illustrative and not in a limiting sense with the scope of the invention defined by the appended claims.

I claim:

1. In photographic printing apparatus, the combination with a light source adapted to illuminate a negative and a sensitized material in printing position, said light source, negative, and sensitized material being arranged along a common axis, an objective lens for projecting the illuminated image of the negative onto the sensitized material, a beam splitting means interposed between said objective and sensitized material for obtaining a plurality of negative images, one of said images being transmitted onto said sensitized material and the other image being reflected perpendicular to the common axis, of a light sensitive means in the path of the reflected negative image for controlling the energization of said light source, a support means including a ferrous metal plate displaced from the common axis in a plane perpendicular to the plane of the negative and positioned in the focal plane of said objective for receiving the reflected negative image, and means including a magnetic material carried by said light sensitive means and adapted to cooperate with said ferrous metal plate for positioning said light sensitive means on said plate in any position with respect to the reflected negative image thereon.

2. In photographic printing apparatus, the combination with a light source adapted to illuminate a negative and a sensitized material in printing position, said light source, negative, and sensitized material being arranged along a common axis, an objective lens for projecting the illuminated image of the negative onto the sensitized material, and means interposed between said objective and sensitized material for obtaining a plurality of negative images, of a light sensitive means in the path of one of the negative images for controlling the energization of said light source, a screen member carried by said light sensitive means, a support means displaced from the common axis in a plane perpendicular to the plane of the negative for supporting said light sensitive means thereon, mounting means having a plurality of positions for said support means to permit said support means to be positioned in the focal plane of said objective in one position and said screen member to be positioned in the focal plane of said objective in the other position for receiving the reflected negative image, and means on said light sensitive means cooperating with said support means for positioning said light sensitive means in any position thereon with respect to the reflected negative image.

3. In photographic printing apparatus, the combination with a light source adapted to illuminate a negative and a sensitized material in printing position, said light source, negative, and sensitized material being arranged along a common axis, an objective lens for projecting the illuminated image of the negative onto the sensitized material, a beam slitting means interposed between said objective and sensitized material for obtaining a plurality of negative images, one of said images being transmitted onto said sensitized material and the other image being reflected perpendicular to the common axis, of a light sensitive means in the path of the reflected negative image for controlling the energization of said light source, a screen member carried by said light sensitive means, a support means displaced from the common axis in a plane perpendicular to the plane of the negative for supporting said light sensitive means thereon, mounting means having a plurality of positions for said support means to permit said support means to be positioned in the focal plane of said objective in one position and said screen member to be positioned in the focal plane of said objective in the other position for receiving the reflected negative image, and means on said light sensitive means cooperating with said support means for positioning said light sensitive means in any position thereon with respect to the reflected image.

4. In photographic printing apparatus, the combination with a light source adapted to illuminate a negative and a sensitized material in printing position, said light source, negative, and sensitized material being arranged along a common axis, an objective lens for projecting the illuminated image of the negative onto the sensitized material, a beam splitting means interposed between said objective and sensitized material for obtaining a plurality of negative images, one of said images being transmitted onto said sensitized material and the other image being reflected perpendicular to the common axis, of a light-sensitive means in the path of the reflected negative image for controlling the energization of said light source, a screen member carried by said light-sensitive means, a support means including a ferrous metal plate displaced from the common axis in a plane perpendicular to the plane of the negative for supporting said light sensitive means thereon, mounting means having a plurality of positions for said support means to permit said support means to be positioned in the focal plane of said objective in one position and said screen member to be positioned in the focal plane of said objective in the other position for receiving the reflected negative image, and means including a magnetic material carried by said light sensitive means and adapted to cooperate with said ferrous metal plate for positioning said light sensitive means in any position with respect to the reflected image thereon.

KIRBY B. AUSTIN.

REFERENCES CITED

The following references are of record in the file of this patent:

UNITED STATES PATENTS

| Number | Name | Date |
|---|---|---|
| 1,268,154 | Root | June 4, 1918 |
| 1,778,481 | Boucher | Oct. 14, 1930 |
| 2,298,344 | Burnham | Oct. 13, 1942 |
| 2,346,582 | Insler | Apr. 11, 1944 |